J. W. WRIGHT.
DIVISION BLOCK FOR BALING PRESSES.
APPLICATION FILED SEPT. 28, 1916.
1,224,697.
Patented May 1, 1917.
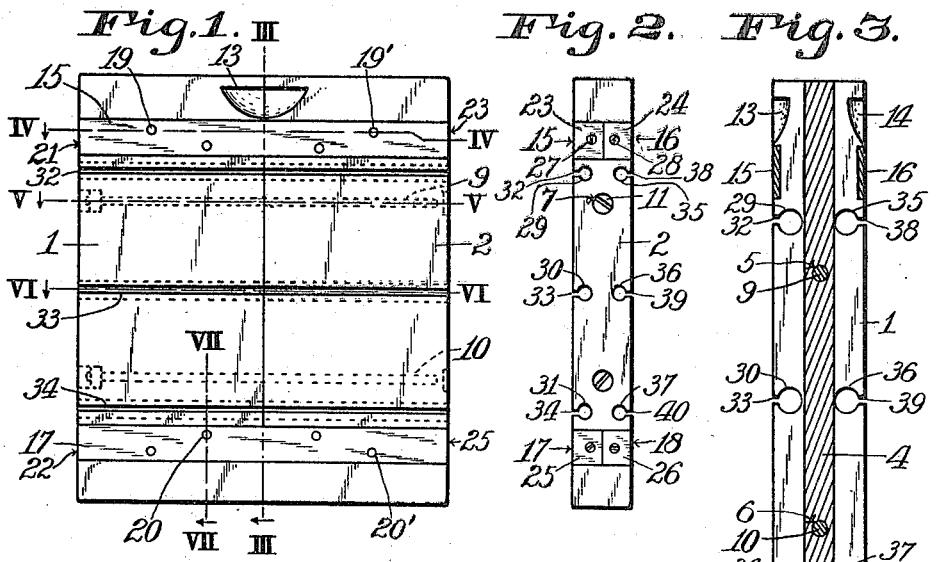
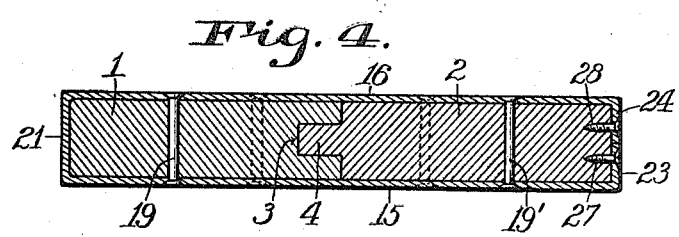
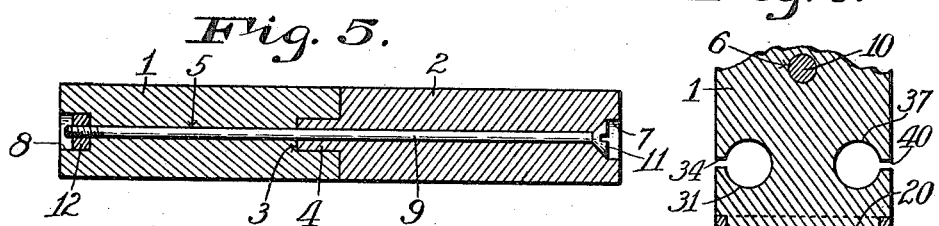
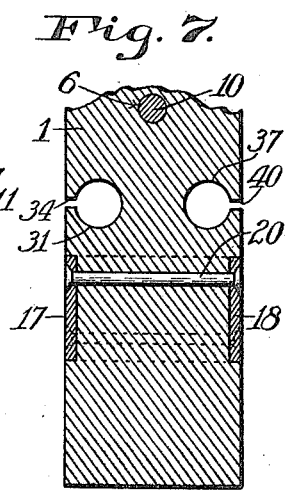
WITNESSES:
J. H. Gardner
Myrtle McCoy
INVENTOR:
John W. Wright,
BY
E. T. Silvius,
ATTORNEY.

UNITED STATES PATENT OFFICE.

JOHN WILLIAM WRIGHT, OF MARION TOWNSHIP, BOONE COUNTY, INDIANA.

DIVISION-BLOCK FOR BALING-PRESSES.

1,224,697.     Specification of Letters Patent.     Patented May 1, 1917.

Application filed September 28, 1916. Serial No. 122,634.

*To all whom it may concern:*

Be it known that I, JOHN WILLIAM WRIGHT, a citizen of the United States, residing in Marion township, in Boone county and State of Indiana, have invented a new and useful Division-Block for Baling-Presses, of which the following is a specification, reference being had to the accompanying drawings and to the letters and figures of reference marked thereon.

This invention relates to the type of division-block or board that is used in baling-presses between the bales of hay or other substance while the bales are being formed, the invention having reference more particularly to various features of construction of a division-block of the above-mentioned character.

An object of the invention is to provide a division-block that may be constructed principally of wood so as to be sufficiently light in weight to be conveniently handled and which may be produced inexpensively and be adapted to withstand the rough usage to which the division-blocks are subjected. Another object is to provide an improved division-block or board of such construction as to be thoroughly protected against the wearing action of the lugs that are provided in baling-presses for temporarily holding the division-blocks in position, an aim being to so construct the division-block that the protecting means shall be capable of also performing the function of securely holding portions of the division-block together and preventing warping of the wooden parts thereof. Another object is to provide a division-block with improved channels to receive the baling wires and prevent choking or filling of the channels by chaff or small particles of the substance being baled; which improved division-block shall be strong, durable and economical in use.

With the above-mentioned and other objects in view the invention consists in a composite or built up division-block of improved construction, and in the parts and combinations and arrangements of parts as hereinafter particularly described and further defined in the accompanying claims.

Referring to the drawings,—Figure 1 is a face elevation of the improved division-block; Fig. 2 is an end elevation of the division-block; Fig. 3 is a vertical transverse section approximately on the line III—III on Fig. 1; Fig. 4 is a horizontal section approximately on the line IV—IV on Fig. 1; Fig. 5 is a section on the line V—V on Fig. 1; Fig. 6 is a section on the line VI—VI on Fig. 1, and Fig. 7 is a fragmentary section on the line VII—VII on Fig. 1.

The improved division-block comprises a body part that is mainly composed of wood, there being preferably two sections 1 and 2 that are suitably joined together with the grain of the wood extending vertically, one edge of one section having a groove 3 therein, the adjacent edge of the adjacent section having a tongue 4 therein that is inserted and secured in the groove, the two sections together forming a solid body through which a suitable number of bolt holes 5 and 6 are bored transversely through the body part, one end of each hole having a counter-bore 7 to receive the head of the bolt, the opposite end of the hole having a counter-bore 8 to receive a bolt-nut. Bolts or rods 9 and 10 are inserted in the bolt holes respectively, each bolt having a head 11 thereon that is seated in the counter-bore 7, a nut 12 being inserted in counter-bore 8 and connected to the bolt or rod, the nut being tightened so that the bolt and nut securely bind the sections 1 and 2 together without obstructively projecting from the ends of the division-block. The upper portions of the wooden body part have recesses 13 and 14 therein to form a hand-hold whereby to lift the block.

At a suitable distance below the normal top of the division-block two metallic protecting plates 15 and 16 are secured to the two broader faces respectively and two similar plates 17 and 18 are secured to the body part at a suitable distance from the normal bottom thereof, each plate being set in so that its face is on the plane of the face of the wooden body part. Each plate extends entirely across the face of the body part, the upper plates being secured firmly to the wood by means of rivets 19, 19', the lower plates being likewise secured by rivets 20, 20'. The plates are designed to assist in binding the sections of the body part together and prevent warping of the wood and are so arranged as to be in proper position to be engaged by the dogs of the machine and protect the wooden portions against the wearing action of the dogs. Preferably an end plate 21 is integrally connected to the plates 15 and 16, a similar plate 22 being connected to the plates 17 and 18, and set in flush with one end of the body part, the opposite end of the body part being embraced by relatively short plates 23 and 24 formed integrally with the plates 15 and 16 respectively, and similar plates 25 and 26 connected to the plates 17 and 18 respectively, the short plates being secured in place by means of screws 27 and 28 respectively.

The improved channels to receive the tie wires comprise a suitable number of cylindrical holes 29, 30, 31, each hole being bored transversely through the wooden body part at a suitable distance from one face thereof, and slots 32, 33, 34 extending from the face of the body part to the nearest portion of the hole, the opposite portion of the body part having also a suitable number of cylindrical holes 35, 36, 37, and slots 38, 39, 40, extending from the adjacent face of the body part to the holes respectively. Since the guide channels are first separately formed and the wood cleared therefrom by means of the boring-bit, the slots for the lateral passage of the tie wires may be sufficiently narrow to prevent the entrance of hay or chaff that would prevent the free passage of the tie wires, the slots being cut by means of a saw.

In practical use a sufficient quantity of substance is packed in a baling-press to form a bale, after which one of the division-blocks is dropped into the baling-chamber ahead of suitable lugs operating to hold the substance that has been loosely pressed into the baling-chamber, the division-blocks being subsequently forced back past the yielding lugs, the latter contacting with the protecting plates at the ends of the division-blocks. According to a well known custom the tie wires are inserted through the guide channels provided for the purpose and pass laterally through slots extending from the channels, as is well understood.

Having thus described the invention, what is claimed as new is—

1. A division-block comprising a body part composed of two sections, one section having a groove, the remaining section having a tongue extending into the groove, bolts embedded in the sections and extending through the tongue, the bolts being rigidly secured in the sections and rigidly securing the tongue in the groove to constitute a solid body part, the body part having cylindrical guide channels bored therethrough and also relatively narrow slots extending from the faces of the body part to the channels, and protecting face plates set into the face portions of the body part and secured thereto, the face plates extending across the body part from end to end thereof.

2. A division-block comprising a body part composed of two sections, one section having a groove, the remaining section having a tongue extending into the groove, bolts stationarily embedded transversely in the sections and extending through the tongue, the bolts being rigidly secured in the sections and rigidly securing the tongue in the groove to constitute a solid body part, the body part having cylindrical guide channels bored therethrough and also relatively narrow slots extending from the faces of the body part to the channels, protecting face plates set into the face portions of the body part and secured thereto, the face plates extending across the body part from end to end thereof, and protecting end plates integrally connected to the face plates and set into the faces of the ends of the body part respectively.

In testimony whereof, I affix my signature in presence of two witnesses.

JOHN WILLIAM WRIGHT.

Witnesses:
  E. T. SILVIUS,
  J. H. GARDNER.

Copies of this patent may be obtained for five cents each, by addressing the "Commissioner of Patents, Washington, D. C."